United States Patent [19]
Senshu et al.

[11] Patent Number: 5,671,101
[45] Date of Patent: Sep. 23, 1997

[54] TRACKING CONTROL CIRCUIT FOR MAINTAINING SUBSTANTIAL BALANCE BETWEEN REPRODUCED SIGNAL LEVELS FROM PLURAL ROTARY MAGNETIC HEADS WHEN TRACKING CONTROL IS APPLIED IN RESPECT TO ONLY ONE OF THE HEADS

[75] Inventors: Yoichirou Senshu, Kanagawa; Moriyuki Kawaguchi, Tokyo, both of Japan

[73] Assignee: Sony Corporation, Tokyo, Japan

[21] Appl. No.: 577,066

[22] Filed: Dec. 21, 1995

Related U.S. Application Data

[63] Continuation of Ser. No. 237,159, May 3, 1994, abandoned.

[30] Foreign Application Priority Data

May 11, 1993 [JP] Japan ..................... 5-132803

[51] Int. Cl.⁶ .................................. G11B 5/588
[52] U.S. Cl. ..................... 360/77.14; 360/77.13; 386/115
[58] Field of Search ................... 360/102, 103, 360/27, 77.12, 77.13, 77.14; 386/23, 115

[56] References Cited

U.S. PATENT DOCUMENTS

| | | | |
|---|---|---|---|
| 4,439,799 | 3/1984 | Haubrich et al. | 360/77.14 |
| 4,639,799 | 1/1987 | Inoue | 360/85 |
| 4,692,816 | 9/1987 | Sugiyama et al. | 360/19.1 |
| 5,003,413 | 3/1991 | Miyazaki | 360/77.14 |
| 5,055,952 | 10/1991 | Noh | 360/77.14 |
| 5,359,473 | 10/1994 | Kaniwa et al. | 360/77.14 |

FOREIGN PATENT DOCUMENTS

| | | |
|---|---|---|
| 2 081 238 | 4/1993 | Canada . |
| 0193129 | 9/1986 | European Pat. Off. ........ G11B 5/592 |
| 0 240 364 A1 | 10/1987 | European Pat. Off. . |
| 0257974 | 3/1988 | European Pat. Off. ........ G11B 5/588 |
| 0 380 284 A1 | 8/1990 | European Pat. Off. . |
| 0 458 531 A2 | 11/1991 | European Pat. Off. . |
| 0 472 375 A2 | 2/1992 | European Pat. Off. . |
| 0 476 766 | 3/1992 | European Pat. Off. . |
| 0 476 767 A1 | 3/1992 | European Pat. Off. . |
| 0 548 503 A1 | 6/1993 | European Pat. Off. . |

OTHER PUBLICATIONS

John Watkinson, *The D-2 Digital Video Recorder*, 1990, pp. 143–158.

*Primary Examiner*—Aristotelis M. Psitos
*Assistant Examiner*—Larry T. Cullen
*Attorney, Agent, or Firm*—William S. Frommer; Alvin Sinderbrand

[57] ABSTRACT

A magnetic recording and reproducing apparatus includes a rotary drum that has a magnetic tape wound around the drum and first and second magnetic heads mounted on the drum for scanning the magnetic tape as the tape is advanced to reproduce an information signal recorded in successive oblique tracks on the tape. The first magnetic head has a magnetic gap that is inclined in a clockwise direction, relative to a line that is normal to a scanning direction of the magnetic heads, when viewed from the rotary drum. The second magnetic head has a magnetic gap that is inclined in a counterclockwise direction, relative to a line that is normal to the scanning direction of the magnetic heads, when viewed from the rotary drum. A tracking control circuit controls the scanning locus of the first magnetic head relative to an oblique track which the first magnetic head reproduces. The first head is selected for control because it inherently has a weaker signal due to the greater inclination of its azimuth angle from the direction of orientation of the magnetic material on the tape. Also, a tracking control pilot signal is generated by adding respective control bits to subdivisions of predetermined length of a digital recording signal. In this way, a low frequency component is superimposed on the digital signal to form the tracking control pilot signal.

12 Claims, 14 Drawing Sheets

FIG. 2
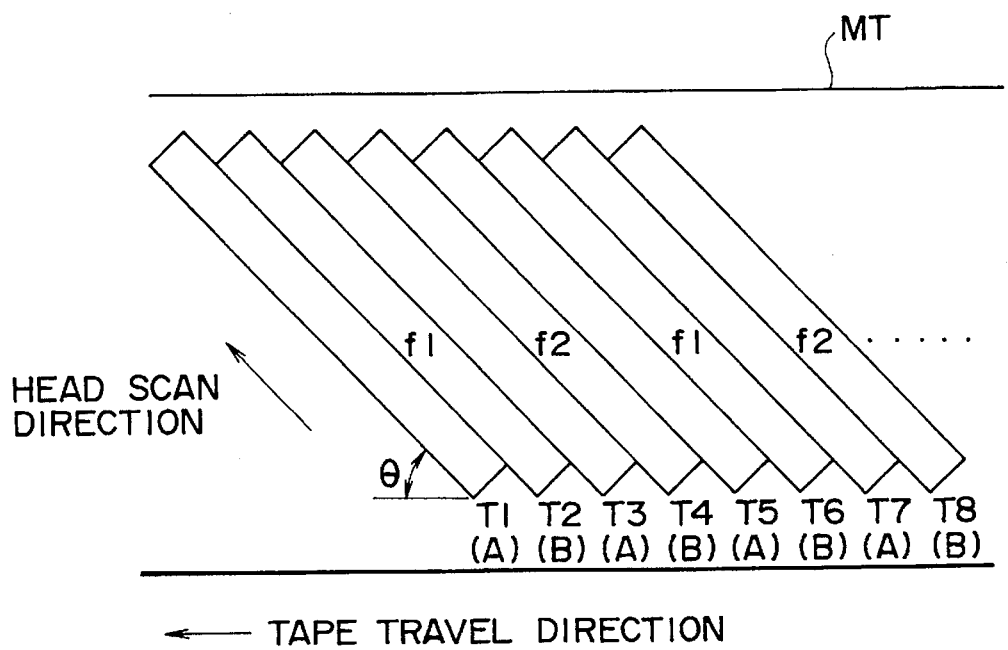
FIG. 3A
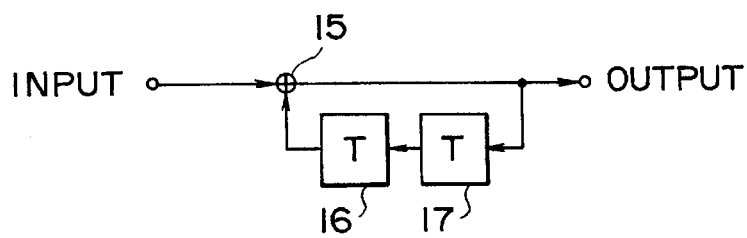
FIG. 3B
| (MOST SIGNIFICANT BIT) | d7 | | $d7 \oplus p1$ |
| --- | --- | --- | --- |
| | d6 | | $d6 \oplus p0$ |
| | d5 | PRECODING | $d5 \oplus d7 \oplus p1$ |
| | d4 | $\longrightarrow$ | $d4 \oplus d6 \oplus p0$ |
| | d3 | | $d3 \oplus d5 \oplus d7 \oplus p1$ |
| | d2 | | $d2 \oplus d4 \oplus d6 \oplus p0$ |
| | d1 | | $d1 \oplus d3 \oplus d5 \oplus d7 \oplus p1$ |
| (LEAST SIGNIFICANT BIT) | d0 | | $d0 \oplus d2 \oplus d4 \oplus d6 \oplus p0$ |

G1 (CORRESPONDING TO f1)

G2 (CORRESPONDING TO f2)

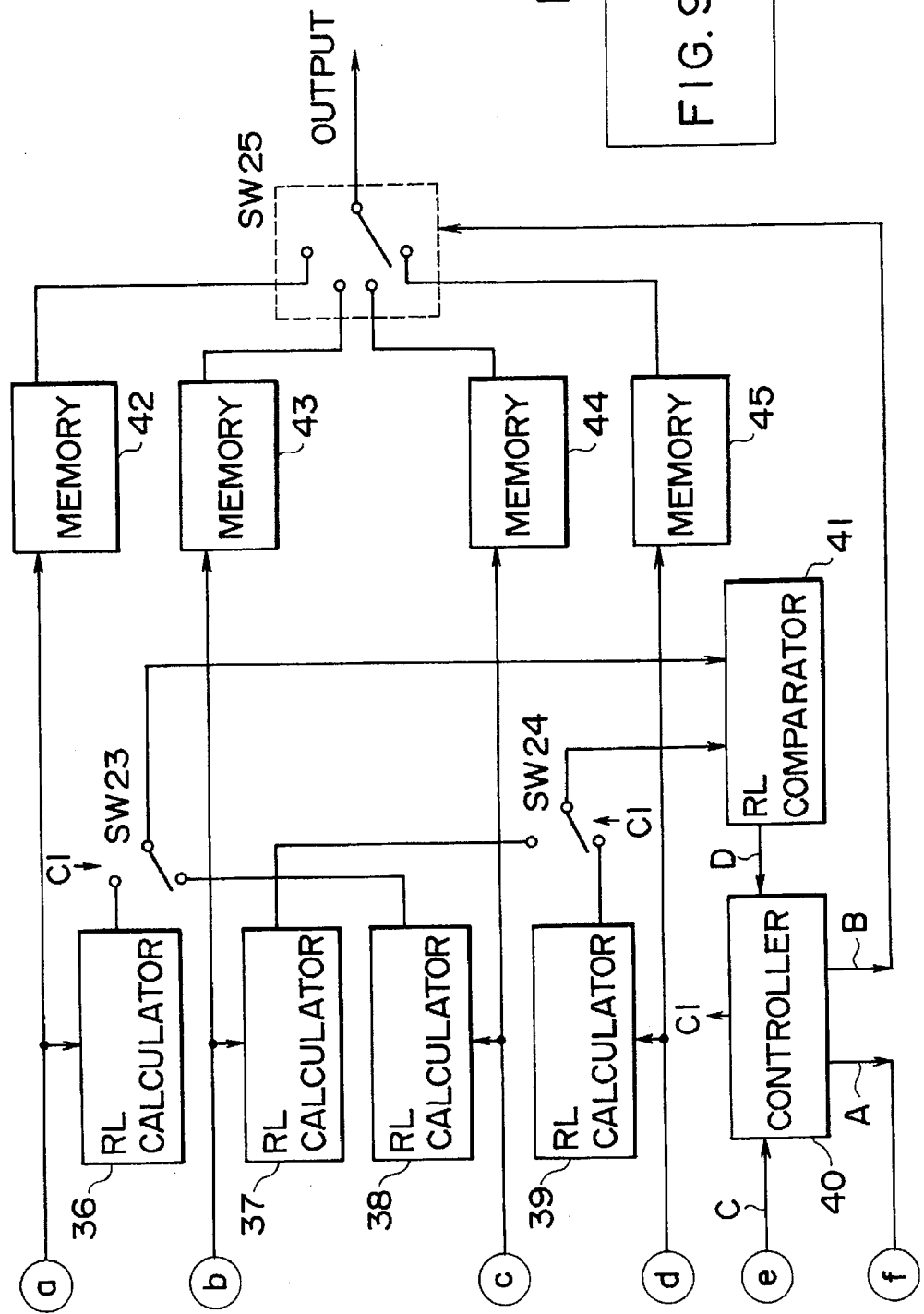

TRACKING CONTROL CIRCUIT FOR MAINTAINING SUBSTANTIAL BALANCE BETWEEN REPRODUCED SIGNAL LEVELS FROM PLURAL ROTARY MAGNETIC HEADS WHEN TRACKING CONTROL IS APPLIED IN RESPECT TO ONLY ONE OF THE HEADS

This application is a continuation of application Ser. No. 08/237,159, filed May 3, 1994, now abandoned.

BACKGROUND OF THE INVENTION

1. Field of the Invention

This invention relates to automatic tracking control systems for use in rotary head magnetic recording/reproducing devices such as a video tape recorder ("VTR").

2. Description of the Related Art

It is well known to provide a VTR for recording or reproducing a video signal on or from a magnetic tape wound around a rotary head drum. In such a device, successive oblique tracks are formed on the magnetic tape as the tape is advanced.

FIGS. 13A–13C illustrate an overall arrangement of a rotary drum and associated structure in a conventional VTR. FIG. 13A is a top view of the rotary drum, FIG. 13B is a side view of the rotary drum, and FIG. 13C shows the magnetic heads mounted on the drum as viewed from outside the drum. FIG. 14 is illustrative of a track pattern formed on the magnetic surface of the tape by the VTR.

Referring to FIGS. 13A and 13B, a magnetic tape MT is supplied from a supply reel (not shown) and is wound around the periphery of a rotary drum 81 with a winding angle of approximately of 180°. The tape MT is advanced in a direction indicated by arrow A1 and is taken up by a take-up reel (not shown). The rotary drum 81 is formed of a rotating upper drum 81a (FIG. 13B) and a stationary lower drum 81b. The upper drum 81a rotates in a counterclockwise direction, as indicated by arrow A2 (FIG. 13A), and has mounted thereon a pair of magnetic heads HA and HB arranged in diametrically opposed positions on the periphery of the upper drum. As shown in FIG. 13C, the heads HA and HB respectively have gaps with mutually different azimuth angles.

Tape guides 82 and 85 define a path along which the magnetic tape MT travels between the supply and take-up reels, while tape guides 83 and 84 guide the magnetic tape MT so that it travels with an inclined orientation relative to the rotary drum 81.

As shown in FIG. 14, in a VTR of the type just described, the magnetic heads HA and HB respectively form alternate recording tracks on the magnetic tape MT. In particular, tracks Ti(A), T3(A), T5(A), T7(A), and so on are formed by the magnetic head HA, while tracks T2(B), T4(B), T6(B), T8(B) and so on are formed by the magnetic head HB. The symbol θ is indicative of the "track angle", which is the angle between the direction in which the tape is advanced and the direction in which the heads scan the tape to form the recording tracks.

FIGS. 15A–15C illustrate the overall arrangement of a rotary drum and magnetic heads, and a track pattern, of another conventional VTR, in which two recording tracks are formed or reproduced simultaneously. FIG. 15A is a top view of the rotary drum, FIG. 15B shows the magnetic heads as viewed from outside of the rotary drum, and FIG. 15C shows the track pattern formed on the magnetic surface of the magnetic tape MT, as disclosed, for example, in European Patent Application No. 0,548,503.

In the VTR of FIGS. 15A–15C, a pair of magnetic heads HA and HB are mounted in proximity to each other on the rotary drum. The two magnetic heads HA and HB have respective magnetic gaps GA and GB, with the gaps being displaced from each other in the head scanning direction by an interval GL and displaced in a transverse direction by a distance D.

The magnetic heads HA and HB simultaneously scan the magnetic tape MT to form inclined recording tracks having a track pitch Tp=D on the magnetic tape. As before, tracks T1(A), T3(A) and so on are formed by the magnetic head HA, while tracks T2(B), T4(B) and so on are formed by the magnetic head HB. It will be seen that a pair of tracks is formed each time the heads HA and HB together scan across the tape.

Reproduction of the signal recorded in the pairs of tracks formed on the magnetic tape requires tracking control to be applied to the magnetic heads HA and HB so that the heads correctly follow the recorded tracks. Several conventional techniques have been provided to implement such tracking control. One such technique, known as the CTL method, includes recording a control signal along a longitudinal track on the magnetic tape while forming the oblique video recording tracks. During reproduction, this control signal is reproduced and is compared with a signal generated by a reference oscillator to form a tracking error signal, which in turn is used to control advancement of the magnetic tape. Another technique, known as the ATF method, entails superimposing a pilot signal on the inclined recording tracks. During reproduction, a cross-talk component of the pilot signal is picked up by a rotary head from a track adjacent to the track being reproduced by the head, and the cross-talk signal is used to form a tracking error signal for controlling advancement of the magnetic tape. The latter technique is disclosed, for example, in European Patent Application no. 0,561,281.

It may be necessary when carrying out the abovementioned tracking control techniques to perform tracking control with respect to only one of the magnetic heads HA and HB. However, when tracking control is performed with respect to only one of the heads, it is quite possible that the magnetic head not under tracking control will fail to correctly follow its respective tracks, if, for example, some external disturbance takes place. Moreover, if there is an error in the mounting positions of the magnetic heads HA and HB, the magnetic head that is not under tracking control may deviate from the track which it is to reproduce. It is especially possible, when a magnetic tape is reproduced by a VTR that is different from the VTR which recorded the tape, that differences in the mechanism between the reproducing VTR and the recording VTR may increase the likelihood of a tracking error. As a result, the level of the reproduced signal provided by the magnetic head not under tracking control may be reduced, thereby throwing out of balance the respective reproduction signal levels of the two magnetic heads.

OBJECTS AND SUMMARY OF THE INVENTION

Accordingly, it is an object of the present invention to provide a rotary head type magnetic recording/reproducing apparatus in which the respective levels of the reproduction signals provided by the magnetic heads are easily maintained in balance when tracking control is applied only to one of the magnetic heads.

In accordance with an aspect of the present invention, there is provided a magnetic recording and reproducing apparatus which includes a rotary drum having a magnetic tape wound around the rotary drum, and first and second magnetic heads mounted on the rotary drum for scanning the magnetic tape as the magnetic tape is advanced to reproduce an information signal recorded in successive oblique tracks on the magnetic tape. According to this aspect of the invention, the first magnetic head has a magnetic gap that is inclined in a clockwise direction, relative to a line that is normal to a scanning direction of the magnetic heads, when viewed from the rotary drum; and the second magnetic head has a magnetic gap that is inclined in a counterclockwise direction relative to a line that is normal to the scanning direction of the magnetic heads, when viewed from the rotary drum. According to this aspect of the invention, the apparatus further includes means for controlling a scanning locus of the first magnetic head relative to one of the oblique tracks reproduced by the first magnetic head.

According to another aspect of the invention, tracking control is not applied to the second magnetic head.

According to further aspects of the invention, the means for controlling is responsive to tracking control signals reproduced from the magnetic tape by the first magnetic head, and the first magnetic head provides a reproduction signal that has a signal level which is lower than a signal level of a reproduction signal provided by the second magnetic head. According to still further aspects of the invention, the apparatus further includes means for generating a predetermined tracking control signal, and the second magnetic head records the predetermined tracking control signal in oblique tracks formed on the magnetic tape by the second magnetic head. According to yet another aspect of the invention, the predetermined tracking control signal includes first and second signals at respective frequencies and the first and second signals are respectively recorded in alternating ones of the oblique tracks formed by the second magnetic head. According to yet a further aspect of the invention, the oblique tracks reproduced by the first magnetic head do not have the predetermined tracking control signal recorded therein and the first magnetic head reproduces the predetermined tracking control signal as a cross-talk signal, with the apparatus further including means for detecting the predetermined tracking control signal reproduced as a cross-talk signal by the first magnetic head.

According to yet another aspect of the invention, the information signal is a digital signal and the means for generating a predetermined tracking control signal includes means for dividing the video signal into units of 24 bits each and for adding a control bit to each of the units of 24 bits each.

According to still another aspect of the invention, there is provided a magnetic recording and reproducing apparatus that includes a rotary drum having a magnetic tape wound around the rotary drum, and first and second magnetic heads mounted on the rotary drum for scanning the magnetic tape as the magnetic tape is advanced to reproduce an information signal recorded in successive oblique tracks on the magnetic tape. According to this aspect of the invention, the oblique tracks are inclined at an angle $\theta$ with respect to a direction of magnetic orientation of the magnetic tape, the first magnetic head has a magnetic gap that is inclined with respect to the direction of magnetic orientation of the magnetic tape at an angle $\theta+\alpha$ that is greater than the angle $\theta$ and the second magnetic head has a magnetic gap that is inclined with respect to the direction of magnetic orientation of the magnetic tape at an angle $\theta-\beta$ that is less than the angle $\theta+\alpha$. According to this aspect of the invention, the apparatus includes means for controlling a scanning locus of the first magnetic head relative to one of the oblique tracks reproduced by the first magnetic head.

According to another aspect of the invention, tracking control is not applied to the second magnetic head.

According to yet another aspect of the invention, there is provided, in a magnetic recording and reproducing apparatus that includes a rotary drum with a magnetic tape wound around the drum and having at least one magnetic head mounted on the rotary drum for scanning the magnetic tape as the magnetic tape is advanced to record a digital signal in oblique tracks on the magnetic tape, a pilot signal generating circuit for generating a tracking control pilot signal to be recorded in the oblique tracks with the digital signal. According to this aspect of the invention, the circuit includes means for dividing the digital signal into control units, all of the control units consisting of an equal number of bits of the digital signal, and means for adding a control bit to each of the control units to superimpose a low-frequency component on the digital signal. According to further aspects of the invention, each of the control units consists of 24 bits before the control bit is added.

According to yet another aspect of the invention, there is provided, in a magnetic recording and reproducing apparatus that includes a rotary drum with a magnetic tape wound around the drum and having at least one magnetic head mounted on the rotary drum for scanning the magnetic tape as the magnetic tape is advanced to record a digital signal in oblique tracks on the magnetic tape, a pilot signal generating circuit for generating a tracking control pilot signal to be recorded in the oblique tracks with the digital signal. According to this aspect of the invention, the circuit includes means for dividing the digital signal into a sequence of control units, all of the control units consisting of an equal number of bits of the digital signal; first, second, third and fourth precoder circuits; and means for supplying the sequence of control units in parallel to the first through fourth precoder circuits. Further according to this aspect of the invention, each of the precoder circuits includes means for adding a respective control bit to each of the control units and means for performing interleaved NRZI coding on the control units including the respective control bits to form respective output signals. Still further according to this aspect of the invention, the pilot signal generating circuit includes first, second, third and fourth CDS calculating circuits for respectively receiving the output signals from the first through fourth precoders and for calculating a respective Codeword Digital Sum (CDS) for each control unit in the output signals, and signal selection means, responsive to the first through fourth CDS calculating circuits, for selecting one of the output signals, with respect to each control unit, for recording on the magnetic tape.

According to a further aspect of the invention, each of the first through fourth precoders adds a different respective sequence of control bits to the sequence of control units.

According to yet a further aspect of the invention, the signal selection means includes reference generating means for generating a Digital Sum Value (DSV) having a value that varies periodically, and the signal selection means selects for recording, with respect to each control unit, the output signal which has a CDS that is nearest to the DSV generated by the reference generator means.

With the apparatus according to the first aspect of the invention, tracking control is applied only to the one of the magnetic heads which has the lower reproduction signal level, to avoid tracking errors that would make even lower the signal level provided by that magnetic head. Although the other magnetic head may be subject to tracking errors, the effect of such tracking errors is not significant because the signal level provided by the other magnetic head is relatively high. As a result, it is easy to maintain in balance the respective channels represented by the two magnetic heads, even though tracking control is applied only to one of the two heads.

In accordance with other aspects of the invention as described above, a convenient mechanism is provided for superimposing low frequency pilot signals on a digital recording signal.

The above, and other objects, features and advantages of the present invention will be apparent from the following detailed description thereof which is to be read in connection with the accompanying drawings.

BRIEF DESCRIPTION OF THE DRAWINGS

FIG. 2 illustrates a track pattern formed on a magnetic tape by the VTR of FIG. 1;

FIGS. 3A and 3B respectively are a diagram that illustrates a basic precoder circuit used in the digital VTR of FIG. 1, and an illustration of the manner in which output signals are calculated from input signals by the precoder of FIG. 3A;

DETAILED DESCRIPTION OF THE PREFERRED EMBODIMENTS

A preferred embodiment of the invention will now be described, initially with reference to FIG. 1.

Figure 1:
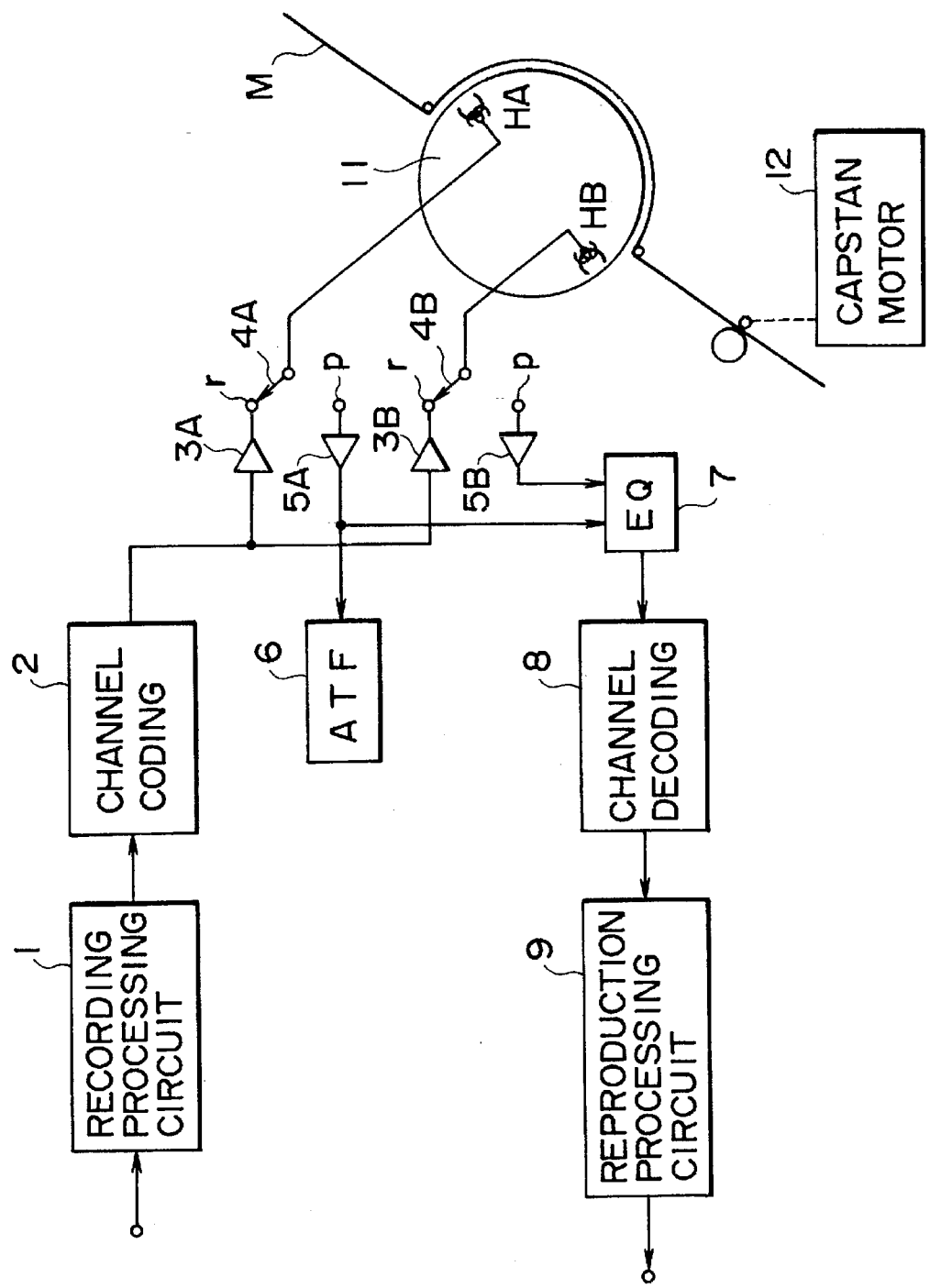
FIG. 1 is a high level block diagram of the recording and reproducing circuitry of a digital VTR in which the present invention is applied.

FIG. 1 illustrates in block diagram form the recording and reproducing circuitry of a digital VTR according to the present invention. As shown in FIG. 1, a recording processing circuit 1 receives an analog video signal as an input signal, and performs A/D conversion thereon, followed by division of the resulting digital video signal into pixel blocks, shuffling of the pixel blocks, and compression-encoding by Discrete Cosine Transform (DCT) processing and variable-length encoding. An error correction code is then added to the compression-encoded signal and the resulting signal is randomized to reduce the DC component. The resulting data signal is then supplied from the recording processing circuit 1 to a channel coder 2 for conversion to a code signal that is suitable for recording. At the same time, in a manner to be described in detail below, a control bit is added to every 24 bits of the recording data signal for one channel in order to superimpose pilot signals at frequencies f1 and f2 on the data to be recorded using the magnetic head HB.

The recording data signal output from channel coder 2 is supplied via recording amplifiers 3A and 3B to respective recording terminals r of recording/reproduction switches 4A and 4B. The recording/reproduction switches 4A and 4B are respectively connected to magnetic recording heads HA and HB, by which the recording data is recorded in oblique tracks on the magnetic tape MT.

The magnetic heads HA and HB have mutually different azimuth angles and are mounted at diametrically opposed positions on a rotary drum 11. Each frame of the digital video signal is divided for recording among a plurality of tracks. For example, 10 tracks are used to record each frame of a signal in the NTSC format, 12 tracks are used for each frame in the PAL format, and 20 tracks are used for each frame in the HDTV format.

During reproduction, a signal reproduced by the magnetic head HA is supplied through a reproduction terminal p of the recording/reproduction switch 4A and a reproduction amplifier 5A to an ATF (Automatic Track Following) circuit 6 and to an equalizer circuit 7. A signal reproduced by the magnetic head HB is supplied through a reproduction terminal p of the recording/reproduction switch 4B and a reproduction amplifier 5B only to the equalizer 7. The ATF circuit 6 detects errors in the track following locus of head HA on the basis of pilot signals reproduced by the head HA, and on the basis of such signals the ATF circuit 6 controls the speed of a capstan motor 12 in order to correct the track following locus of the head HA, in a manner to be described in more detail below.

The equalizer circuit 7 corrects a frequency characteristic of the reproduced signals and outputs the corrected signals to a channel decoder 8. The channel decoder 8 reverses the channel encoding performed by channel coder 2 and outputs the resulting signal to a reproduction processing circuit 9. The reproduction processing circuit 9 performs various processes on the signal supplied thereto, such as eliminating time-axis fluctuation, error correction, reversal of compression-encoding, and D/A conversion, so that a reproduced analog video signal is output from the reproduction processing circuit 9.

Figure 14:
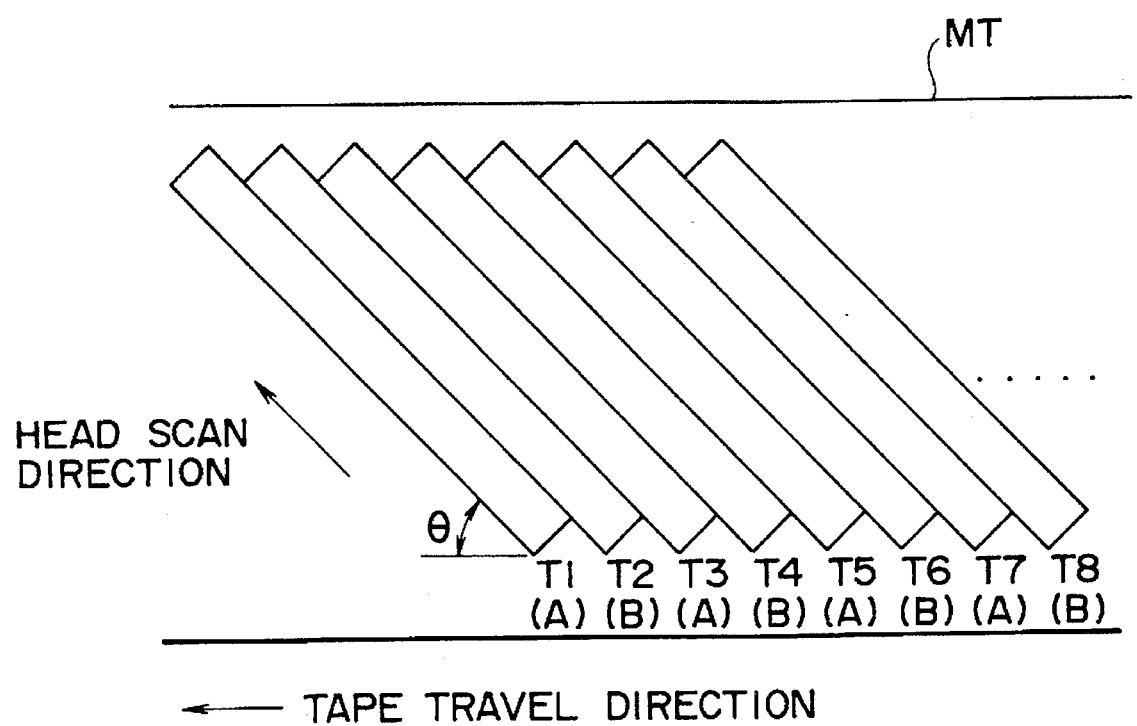
FIG. 14 is an illustration of a recording track pattern formed on a magnetic recording tape by the VTR of FIGS. 13A–13C.

FIG. 2 illustrates a recording track pattern formed by the circuitry of FIG. 1 on the magnetic side of the magnetic tape MT. Features shown in FIG. 2 which correspond to those of FIG. 14 are assigned the same reference characters as in FIG. 14.

As mentioned above, pilot signals at frequencies f1 and f2 are supplied only to magnetic head HB and are provided in such a manner that the signals at frequencies f1 and f2 are alternately recorded in respective tracks formed by head HB. Since head HB forms alternate ones of the recording tracks shown in FIG. 2, pilot signals f1 are recorded in every fourth recording track, and pilot signals f2 are recorded in every fourth recording track, with each track having a pilot signal f1 or f2 being arranged between and adjacent to two tracks in which no pilot signal is recorded. It will also be noted that tracks having a pilot signal at one of the two frequencies do not have pilot signals at the other frequency recorded therein.

Circuitry for generating the pilot signal, which constitutes a portion of the channel coder 2 of FIG. 1, as well as operation of such circuitry, will be described with reference to FIGS. 3–9.

Referring to FIGS. 3A and 3B, there will now be described a modulating scheme, known as interleaved NRZI, that is used in channel coder 2.

A basic circuit used for precoding according to the interleaved NRZI coding scheme is illustrated in block diagram form in FIG. 3A. This precoder circuit operates on a serial digital input signal, which is provided as an input signal to an adder 15. An output from the adder 15 is delayed for two clock periods by unit delay circuits 16 and 17 and the resulting delayed signal is fed back to provide the other input to the adder 15. The output from the adder 15 is also provided as the output from the precoder circuit. It should be understood that the addition performed at adder 15 is a modulo-2 addition. If an 8-bit digital data word is input into the precoder in serial form with its most significant bit (d7) leading followed by successive less significant bits through to the least significant bit (d0), a precoding output is obtained as shown in FIG. 3B. The values p1 and p0 shown in FIG. 3B represent precoded outputs obtained from preceding data and fed back to the adder 15 with a delay of two clock periods at the times when the bits d7 and d6 are input to the adder 15.

The circuitry for providing the pilot signals will next be described.

As discussed above with respect to FIG. 1, in the digital VTR according to this invention, the digital signal input to the channel coder 2 is a randomized signal, so that its Digital Sum Value (DSV) can in statistical terms be regarded as substantially zero. The channel coder 2 operates in accordance with this invention to periodically insert a control bit in the digital recording signal so that the DSV of the recording signal is periodically displaced from zero. The result is that the DSV of the digital recording signal provided in alternate tracks in the recording pattern shown in FIG. 2 has superimposed thereon low frequency components at the frequencies f1 and f2. This is done to provide the 4-track repeating pattern as previously described. As a result, during reproduction of the tracks T1, T3, T5, T7 and so forth by magnetic head HA (which tracks do not include the low frequency components just described), the magnetic head HA reproduces the low frequency components from the adjacent tracks as a cross-talk signal, and such low frequency cross-talk signals can be utilized as a tracking control signal.

The manner in which the low frequency components are formed in accordance with the invention will now be described in basic form with reference to FIGS. 4–6.

Figure 4:
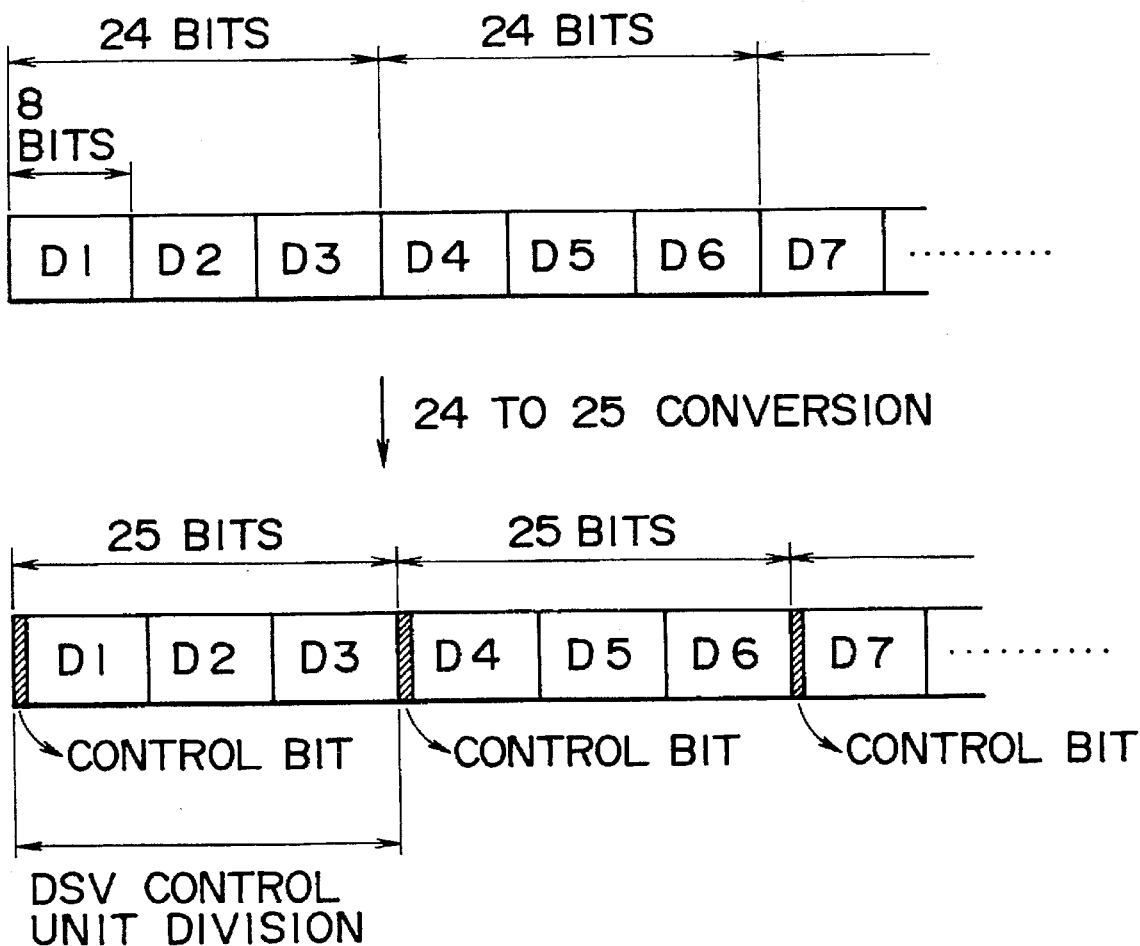
FIG. 4 illustrates how respective control bits are added, according to the invention, to 24-bit control units of a digital recording signal.

For example, if the digital data supplied to the channel coder 2 is in the form of 8-bit data words D1, D2, D3, and so forth, as shown in the upper portion of FIG. 4, the channel coder 2 is arranged so that one control bit is inserted into this serial input data stream at intervals of every 24 bits of the input signal, as shown in the lower portion of FIG. 4. The result is that every 24-bit segment, which will sometimes be referred to as a "control unit", is converted into a 25-bit data segment. The resulting 25-bit control units are then precoded by the above-mentioned interleaved NRZI scheme to form an output signal.

Figure 5A:
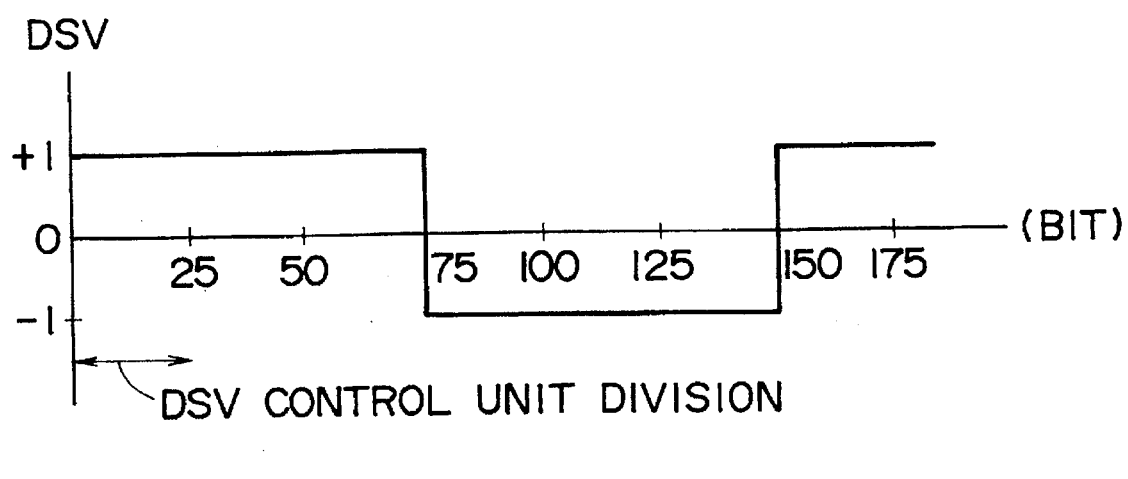
FIGS. 5A and 5B are respectively waveform diagrams which illustrate pilot signals generated in accordance with the invention in the digital VTR of FIG. 1.
Figure 5B:
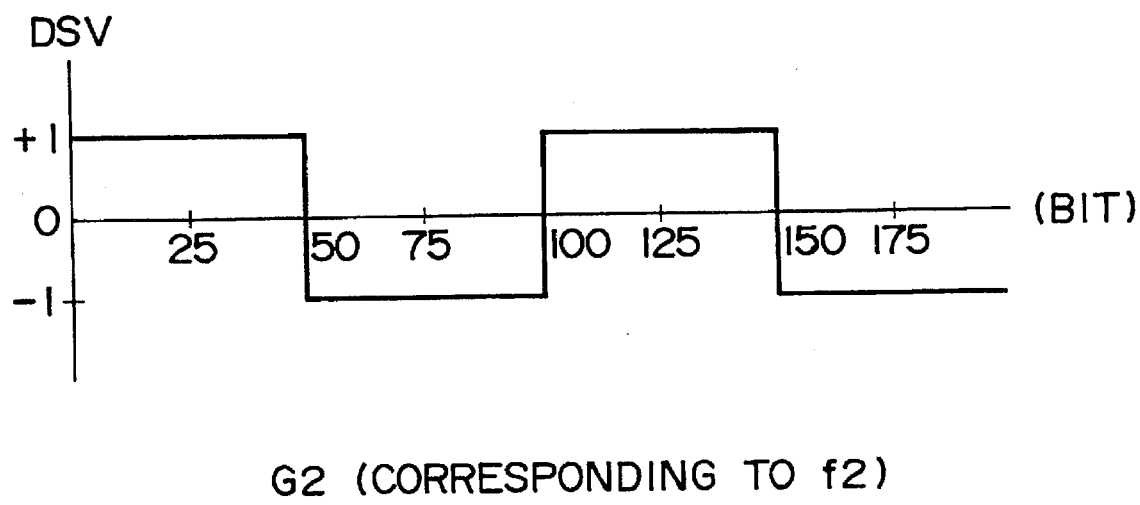

As part of the channel coder 2, a reference signal generator is provided to generate a DSV having a value that varies periodically. On the basis of this periodically varying DSV, it is determined whether the control bit to be added should have the value 1 or 0. This determination is made by calculating a Codeword Digital Sum (CDS) for two alternative 25-bit control units which respectively include control bits of the two different values, and the control unit having a CDS that is nearest to the reference DSV is selected to Me an output signal. As a specific example, the reference signal generator, at different times, outputs a signal G1 having a frequency which corresponds to the frequency f1 as shown in FIG. 5A, and a signal G2 having a frequency which corresponds to the frequency f2 as shown in FIG. 5B. These signals are respectively used for alternate ones of the tracks formed by head HB to generate the low frequency pilot signals used for tracking control.

Figure 6:
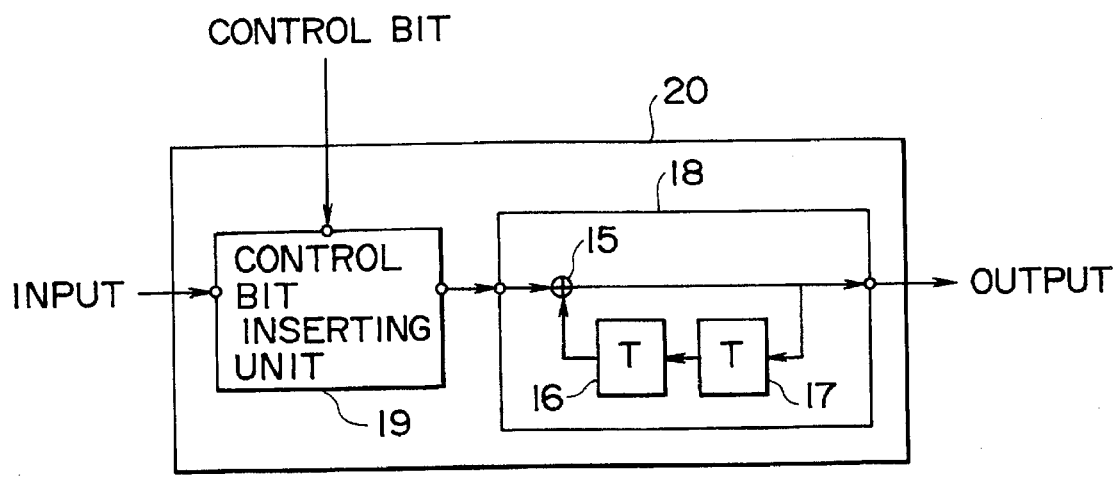
FIG. 6 is a circuit diagram of a basic precoder which adds respective control bits to 24-bit control units, as illustrated in FIG. 4.
Figure 7:
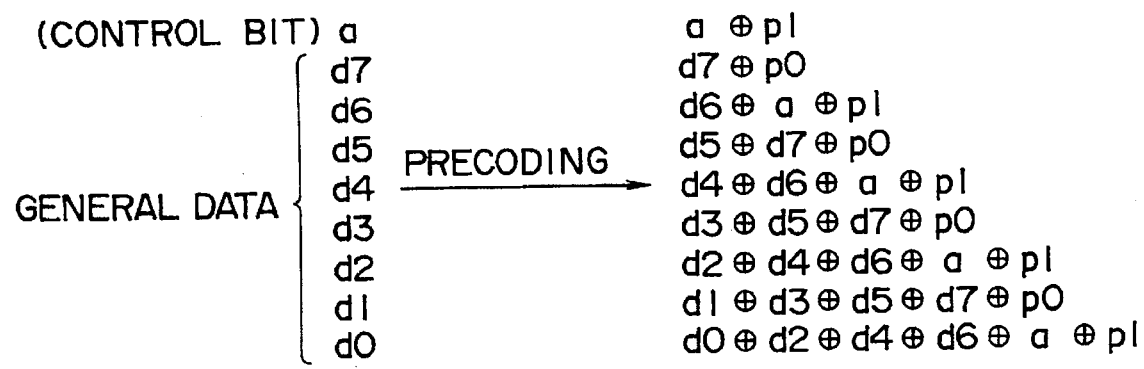
FIG. 7 illustrates the manner in which output signals are calculated from input signals and an added control bit by the precoder of FIG. 6.

Referring to FIG. 6, a basic precoder unit 20 in accordance with the present invention may be formed by providing a precoding circuit 18, like that shown in FIG. 3A, immediately downstream from a control bit inserting unit 19. The control bit inserting unit 19, as will be understood, adds a control bit to each 24-bit control unit provided as an input signal to the control bit inserting unit, and the value of the control bit to be added to each control unit is provided as another input signal to the control bit inserting unit 19. Taking the symbol "a" to represent such value of the control bit, it will be recognized that the output signal provided from the precoding circuit 18 will be as shown in FIG. 7.

The appropriate value "a" for the control bit cannot be determined until the entire 24-bit input control unit is received and the corresponding precoded output is obtained. At that point the CDS resulting from the addition of the control bit and the precoding can be calculated and the CDS compared with the DSV value output from the reference signal generator. As a result, in accordance with the invention, four precoders like the precoder 20 shown in FIG. 6 are provided in parallel in a precoding circuit in order to generate the low-frequency components to be superimposed on the digital recording signal. The precoding circuit with the four parallel precoder units, as well as operation of such circuitry, will be described with reference to FIG. 8, which is a timing chart, and FIG. 9, which is a block diagram of the circuit.

Figure 8:
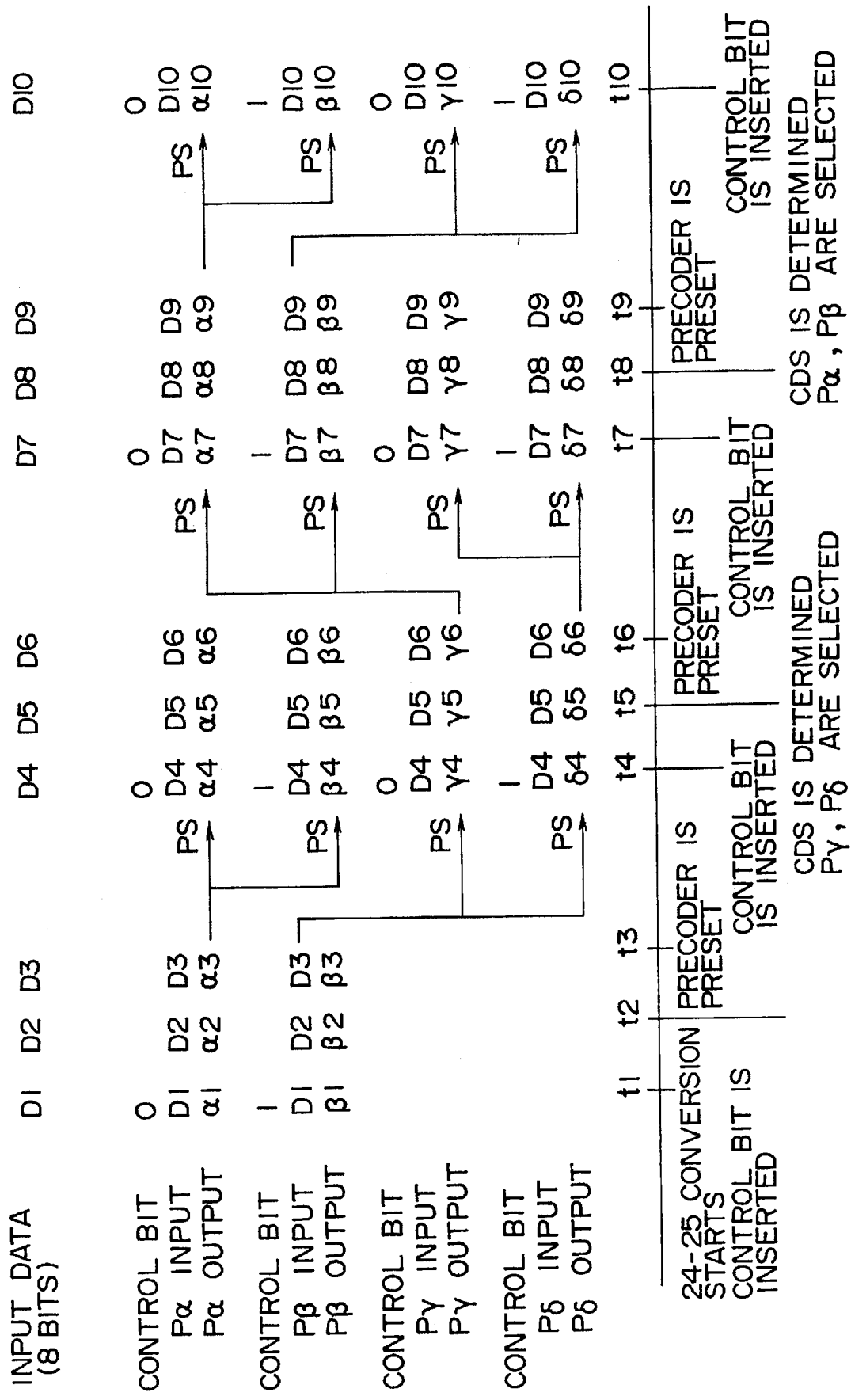
FIG. 8 is a timing chart according to which a pilot signal component is imposed upon a digital recording signal according to the present invention by adding control bits to 24-bit control units of the recording signal.

Referring initially to FIG. 8, the input digital data is provided to the channel coder in the form of a series of eight-bit, bit-serial data words D1, D2, D3, and so forth, and the four parallel precoder units are respectively represented in FIG. 8 by the symbols Pα, Pβ, Pγ and Pδ.

Continuing to refer to FIG. 8, at time t1, when the input of data to the precoders begins, a control bit is inserted at the beginning of the first data word D1. Thus, by the time that all of data words D1 through D3 have been received, a total of 25 bits are present. However, at time t1, it is not known whether the appropriate value for the control bit should be "0" or "1" and therefore a data string which includes a control bit having the value "0" is supplied to the precoder Pα, and a data string which includes a control bit having the value "1" is supplied to the precoder Pβ. When the CDS of both of the 25-bit control units has been calculated for the precoded outputs resulting from both of these data strings, the precoded output having a CDS that is nearest to the DSV value supplied by the reference signal generator is selected to be the output signal from the precoding circuitry.

When all of the data bits through the end of data word D3 have been received, another control bit is inserted at time t4, followed by input of data words D4 through D6.

As shown in FIG. 8, the control bit provided at the beginning of data word D1 and supplied to the precoder Pα has the value 0 and the control bit inserted at the beginning of the second control unit, with respect to the same precoder, again has the value 0. On the other hand, at a time t3 just prior to the time t4, a signal corresponding to the values p1 and p0 shown in FIG. 3B, made up of the last two bits of the precoded output α3 from the precoder Pα corresponding to the data word D3, is provided as a pre-setting signal PS for the precoding circuit in precoder Pβ. Then, at time t4, a control bit having the value "1" is inserted at the beginning of the input data word D4 for input into the precoder Pβ, and the data word D4 having the "1" inserted at the beginning is supplied to the precoder Pβ immediately after the two-bit pre-setting signal. Accordingly, the precoder Pβ will, in time, perform a precoding operation equivalent to that which would result from setting the first control bit to 0 and the second control bit to 1.

Similarly, the precoders Pγ and Pδ both receive at time t3 a presetting signal PS which is made up of the last two bits of the precoded output β3 from the precoder Pβ. Then, at time t4, a control bit having the value "0" is input into precoder Pγ ahead of data word D4, and a control bit having the value "1" is input into precoder Pδ ahead of data word D4. Accordingly, the precoding operation performed by precoder Pγ, in effect, is equivalent to precoding a data string in which the first control bit is set to 1 and the second control bit is set to 0, while the operation performed by precoder Pδ, in effect, both the first and second control bits are set to 1. As a result, at time t4, all four of the precoders operate in parallel to precode the second control unit, and at time t5 the CDS for the precoded output signals α1–α3 of the precoder Pα and the CDS of the precoded outputs β1–β3 of the precoder Pβ are calculated to determine which CDS is nearer the DSV provided by the reference signal generator. For the example shown in FIG. 8, it is assumed that a precoded Output signal corresponding to a first control bit having the value "1" has the CDS that is nearest to the DSV, so that the output of the precoder Pα for the first control unit and the outputs of precoders Pα and Pβ for the second control unit are discarded and the outputs of the precoders Pγ and Pδ are selected for continued processing.

Next, at a time t6 which is just before insertion of the third control bit, the precoders Pα and Pβ from which the outputs have been discarded are provided with respective presetting signals PS which are the last two bits of the precoded output signals γ6, and the precoders Pγ and Pδ are provided with pre-setting signals which are the last two bits of the precoded output signals δ6. Then at time t7 control bits are inserted in the data strings provided to the precoders Pα through Pδ having the respective values 0, 1, 0, 1.

At time t8, the CDS values for the precoded control unit γ4–γ6 and for the precoded control unit 64–66 are calculated and then compared with the DSV value provided by the reference signal generator. It is assumed that based on the result of this comparison, 0 is selected to be the appropriate value for the second control bit, so that the outputs of precoders Pγ and Pδ are then discarded, with the outputs of precoders Pα and Pβ being selected for further processing. Then, at time t9, the precoders Pα and Pβ are provided with pre-setting signals from the output of precoder Pα, and the precoders Pγ and Pδ are provided with pre-setting signals from the output of precoder Pβ. Thereafter, at time t10, a fourth control bit is inserted. It will be appreciated that processing in this manner then continues.

In this way, there is obtained a precoded output signal which has a CDS which is nearest to the DSV provided by the reference signal generator. According to the particular example illustrated in FIG. 8, it will be appreciated that the precoded output signals β1, β2, β3, γ4, γ5, γ6, and so forth are selectively provided as the output signals from the channel coder.

Figure 9A:
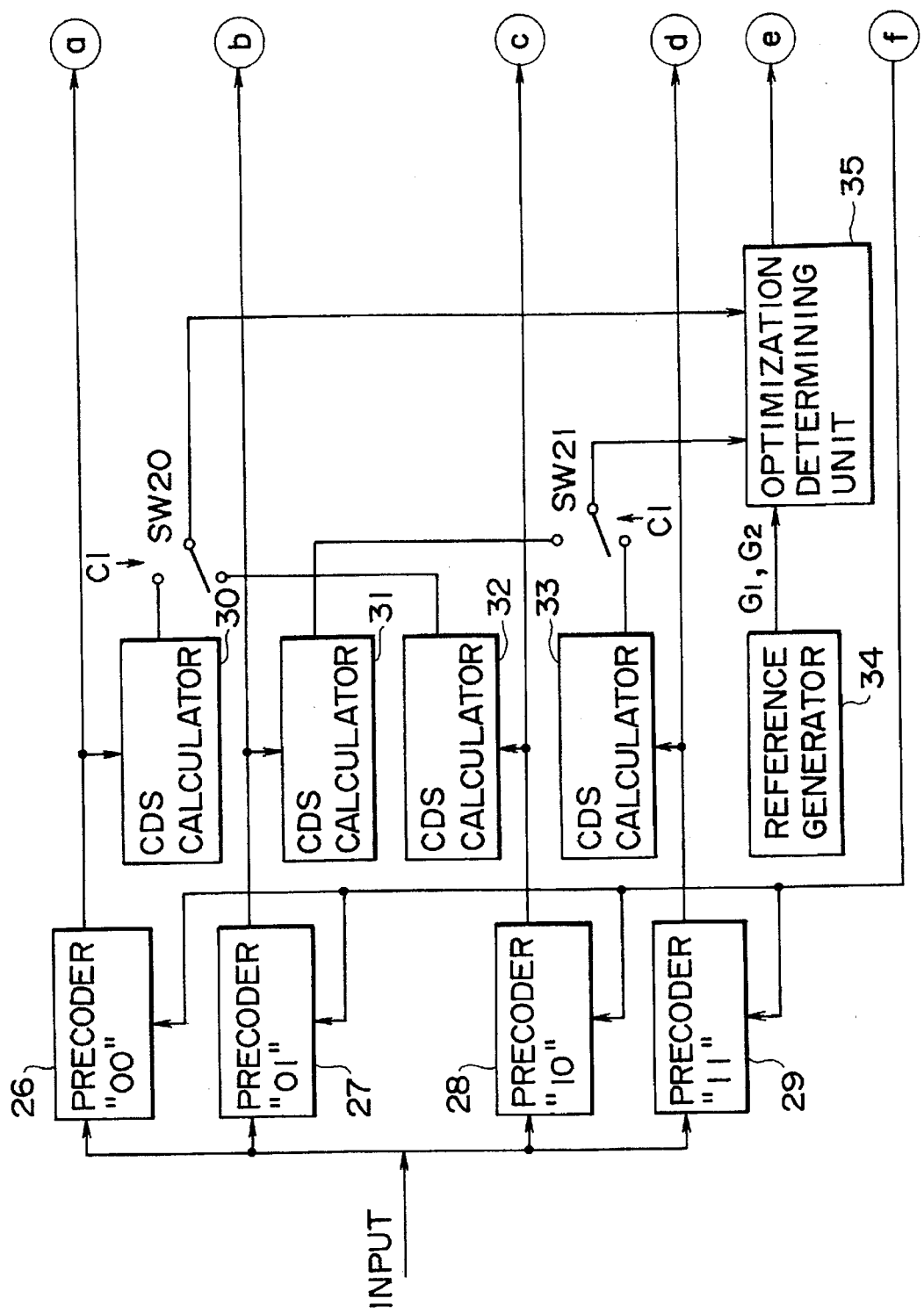
FIG. 9 is a block diagram which illustrates precoding and pilot signal generating circuitry that is incorporated according to the present invention in the channel coder that is part of the digital VTR of FIG. 1.

FIG. 9 is a block diagram of precoding circuitry which performs the above-described operations, and which forms a part of the channel coder 2 of FIG. 1.

Referring to FIG. 9, the precoding circuitry includes four precoders 26–29. It should be understood that with respect to the two digit numerals provided within quotation marks in the labels for the precoders 26–29, the right-hand numeral indicates the value of the control bit inserted at the beginning of the most recently input control unit, and the left-hand numeral indicates the value of the control bit inserted at the beginning of the control unit input immediately before the most recently input control unit. Thus, for example, referring to the data shown in the timing chart of FIG. 8 as of time t5, precoder Pα corresponds to the pre-coder "00", precoder Pβ corresponds to the pre-coder "01", pre-coder Pγ corresponds to the pre-coder "10" and pre-coder Pδ corresponds to the pre-coder "11".

The signals output from the precoders 26–29 are respectively supplied to CDS calculation circuits 30–33. As shown in FIG. 9, switches SW20 and SW21 are provided at the outputs of the CDS calculation circuits and are used to select the CDS values corresponding to the outputs of two of the precoders, while the CDS values corresponding to the other two decoders are discarded. The selected CDS values are provided as input signals to an optimization determining unit 35, which compares the CDS values supplied thereto with the DSV value output from a reference signal generator 34. A signal C indicative of the result of this determination is provided from the optimization determining unit 35 to a controller 40.

The output signals from the precoders 26–29 are stored respectively in buffer memories 42–45, and the outputs of the memories 42–45 are connected to respective inputs of a four-input/one-output switch SW25. Based on the determination output signal C, the controller 40 generates a switching signal B for controlling the state of a switch SW25, so that switch SW25 provides as its output signal the precoder output signal having the CDS that is closest to the DSV value generated by the reference signal generator 34.

It will also be noted that the control circuit 40 provides a control signal C1 for controlling the states of switches SW20 and SW21. (The connections between the controller 40 and the switches SW20 and SW21 are shown in interrupted form in order to simplify the drawing. ) Also, on the basis of a timing signal (not shown) for indicating the timing at which a control bit is to be inserted and the timing at which the above-mentioned determination output signal C is provided, the controller 40 provides a control bit value input signal to each of the precoders 26–29, and also provides appropriate pre-setting signals to the precoders 26–29. The signals by which the controller 40 performs these operations are represented by the control signal A in FIG. 9. It will be understood that, for example, the last two bits of the pre-coded output signal from precoder 26 for a given control unit are provided as a pre-setting signal for the precoders 26 and 27 by way of a signal path formed through CDS calculation circuit 30, switch SW20, optimization determining unit 35 and controller 40. At the same time, the pre-setting signal for the precoders 28 and 29 is provided from the last two precoded output signal bits for that control unit from the precoder 27, via CDS calculation circuit 31, switch SW21, optimization determining unit 35 and controller 40. Alternatively, the pre-setting signal for precoders 26 and 27 would be the last two bits of the precoded output signal from precoder 28, provided via CDS calculation circuit 31, SW21, etc., and the pre-setting signal for precoders 28 and 29 would be the last two bits of the precoded output signal from precoder 29, provided via CDS calculation circuit 33, switch SW21, etc. It should also be understood that each of the precoders includes a switching circuit (not shown), controlled by a signal from the controller 40, for selectively supplying the pre-setting signal to the second input of adder 15 (FIG. 6), instead of the feedback signal generated by the adder 15 and supplied through delay circuits 17 and 16.

It will also be recognized that, as a result of the operation described with reference to FIG. 8, each of the precoders 26–29 adds a different respective sequence of control-bit values to the sequence of input data control units supplied thereto.

There will also be noted, in the circuitry shown in FIG. 9, RL calculators 36–39 which are respectively connected to receive the output signals from the precoders 26–29, and which calculate a run length for the respective output signals of the precoders. The results of such run length calculations are provided to a RL comparator 41 by way of switches SW23 and SW24.

The RL comparator 41 determines whether the calculated run lengths supplied thereto are less than or equal to an upper limit (which may be, for example, 10), and supplies to the controller 40 a signal D which is indicative of the results of the determination made by the RL comparator 41. Based on this run-length determination signal D, and with priority over the signal C provided to the controller 40 from the optimization determining circuit 70, the controller 40 selects, at the switch SW25, the precoder output signal that is to be provided as an output recording signal. This has the effect of enhancing clock reproduction upon playback.

More specifically, if the precoder output that is indicated to be the optimum output on the basis of the CDS, as indicated by the signal C, has a run length that is above the upper limit, a precoder output signal having a run length that is lower than the upper limit is selected instead of the optimum output signal. In other words, the selection that would be indicated by the signal C is disregarded if such output signal has a run length that is over the upper limit. However, if the run lengths of the outputs of both of the currently selected precoders are above the upper limit, then the output signal to be selected as the recording output signal is determined on the basis of the signal C provided by the optimization determining unit 35.

It should be noted that switches SW23 and SW 24 are operated on the basis of the control signal C1 output from the controller 40 and in association with the switches SW20 and SW21, so that the calculated CDS values and run length values for the same two selected pre-coders are provided at the same time to the controller 40. (Connections for providing the control signal C1 to the switches SW23 and SW24 from the controller 40 are shown in interrupted form on FIG. 9 in order to simplify the drawing.)

The effect of applying tracking control only to the magnetic head HA will now be described with reference to FIGS. 10 and 11.

Figure 10:
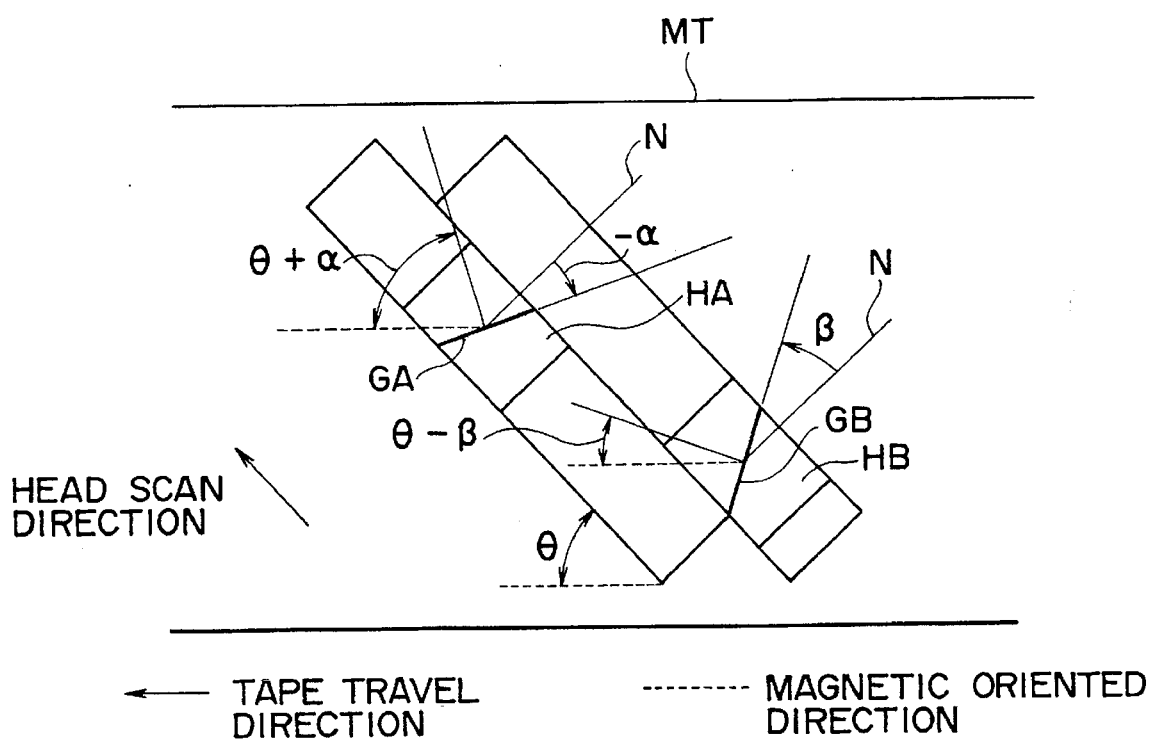
FIG. 10 schematically illustrates the relationship between a recording track pattern and the magnetic recording heads in the digital VTR of FIG. 1.

Referring to FIG. 10, it is assumed that the magnetic heads HA and HB respectively have azimuth angles $-\alpha$ and $+\beta$, and that, during reproduction, the heads scan the inclined tracks in the relationship illustrated in FIG. 10. The plus (+) and minus (−) signs associated with the azimuth angles are respectively indicative of a counter-clockwise and a clock-wise inclination of the magnetic head gap relative to a line N that is normal to the head scanning direction as viewed from the rotary drum.

Figure 11:
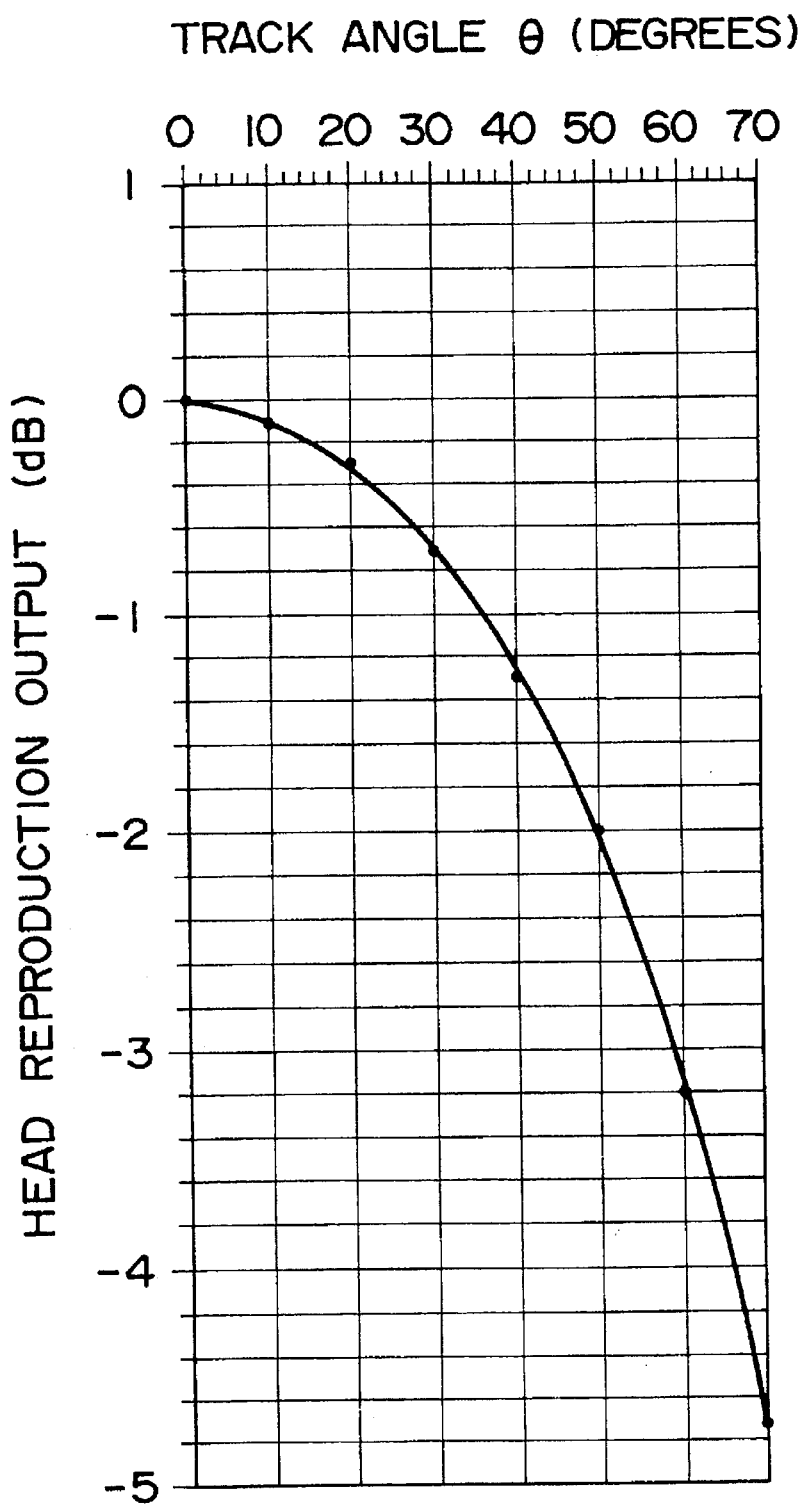
FIG. 11 is a graphical illustration of a relationship between track angle and reproduction signal level in a VTR.

For a magnetic tape on which the magnetic layer is formed by vapor deposition, with the magnetic particles having an orientation along the length of the tape, and where the magnetic head scans at a track angle $\theta$ relative to the longitudinal direction of the tape, and with an azimuth angle of 0°, the level of the reproduction signal provided by the magnetic tape decreases as the track angle $\theta$ increases in a manner as shown in FIG. 11. This relationship between reproduction signal level and track angle is hereinafter referred to as the $F(\theta)$ characteristic.

Because of the respective azimuth angles, there is an inclination between the track direction and the directions of polarity of the gaps GA and GB of the heads HA and HB, the directions of polarity of the gaps being orthogonal to the gaps themselves. As a result, the effective relative velocities of the magnetic heads HA and HB relative to the magnetic tape are the speed at which the head travels relative to the tape multiplied by cos $\alpha$, in the case head HA, and by cos $\beta$, in the case of head HB. Thus the signal level provided by the heads during reproduction varies with the azimuth angle.

Referring again to FIG. 10, because the angles of the polarity directions of the gaps GA and GB of the magnetic heads HA and HB with respect to the direction of orientation of the magnetic substance on the magnetic tape are $\theta+\alpha$ and $\theta-\beta$, respectively, the levels of the reproduction signals from the magnetic heads HA and HB are respectively proportional to $F(\theta+\alpha)\times\cos\alpha$ and $F(\theta-\beta)\times\cos\beta$; if $\alpha=\beta$, then the respective signal levels of the reproduction signals are proportional to $F(\theta+\alpha)$ and $F(\theta-\beta)$. Therefore, because of the $F(\theta)$ characteristic as shown in FIG. 11, the level of the reproduction signal provided by magnetic head HA is lower than the signal level of the reproduction signal provided by the magnetic head HB. For this reason, the VTR of the present invention is arranged so that tracking control is applied only to the magnetic head HA, being the head which has the lower reproduction signal level, and tracking control is not applied to the magnetic head HB, which has the larger reproduction signal level. This arrangement prevents a tracking error from occurring with respect to magnetic head HA, so that the already relatively low reproduction signal level of the head HA will not be further reduced due to tracking errors. As for the magnetic head HB, although it is possible that the reproduction signal level of that head may be reduced due to tracking errors, the effect of such a reduction in signal level is not great because the reproduction signal level of the head HB is inherently relatively high. Accordingly, the reproduction signal levels of the two magnetic heads can easily be maintained in balance.

There will now be described, with reference to FIG. 12, an example of an ATF circuit for performing tracking control in the manner described above.

Figure 12:
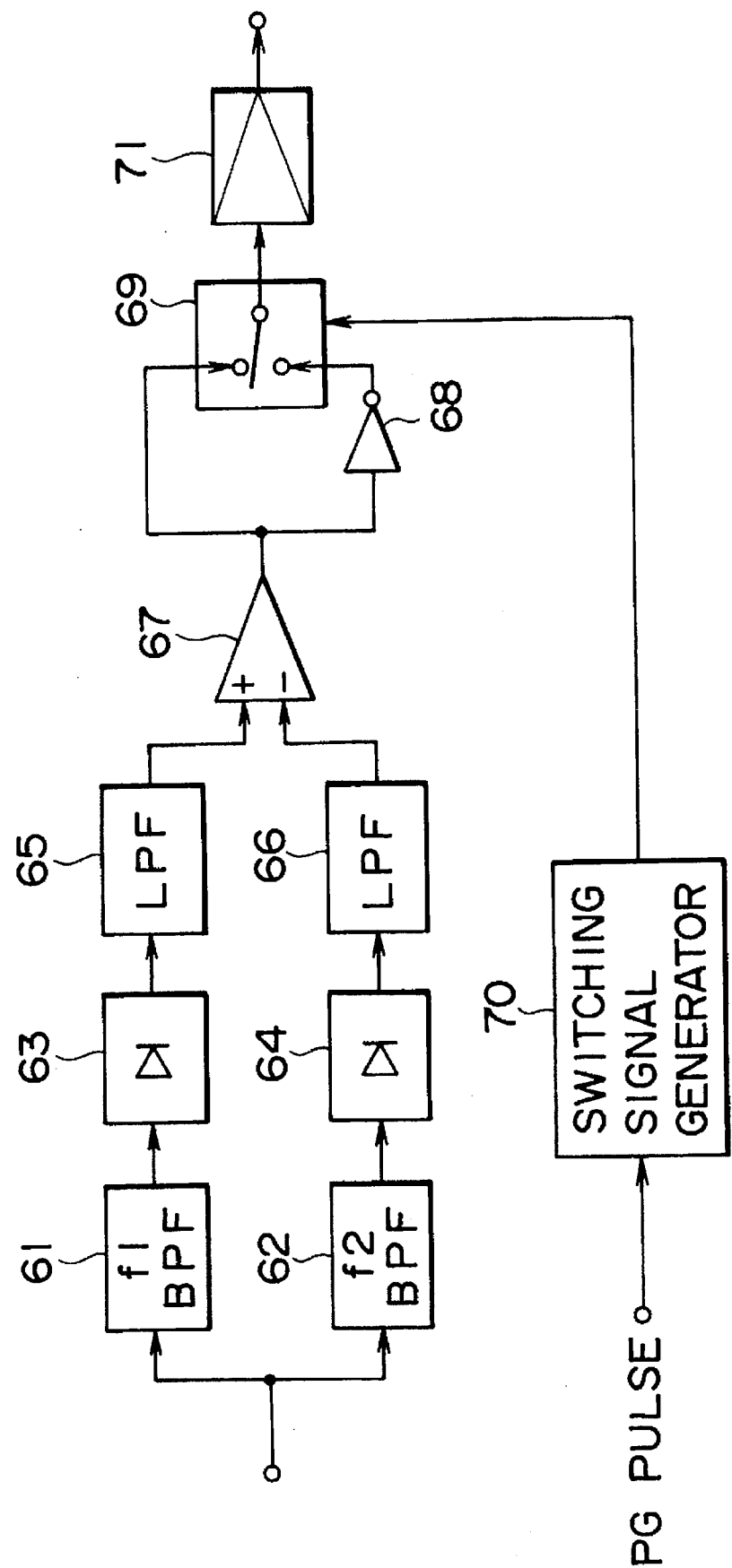
FIG. 12 is a block diagram of an ATF circuit that is part of the digital VTR of FIG. 1.
Figure 13A:
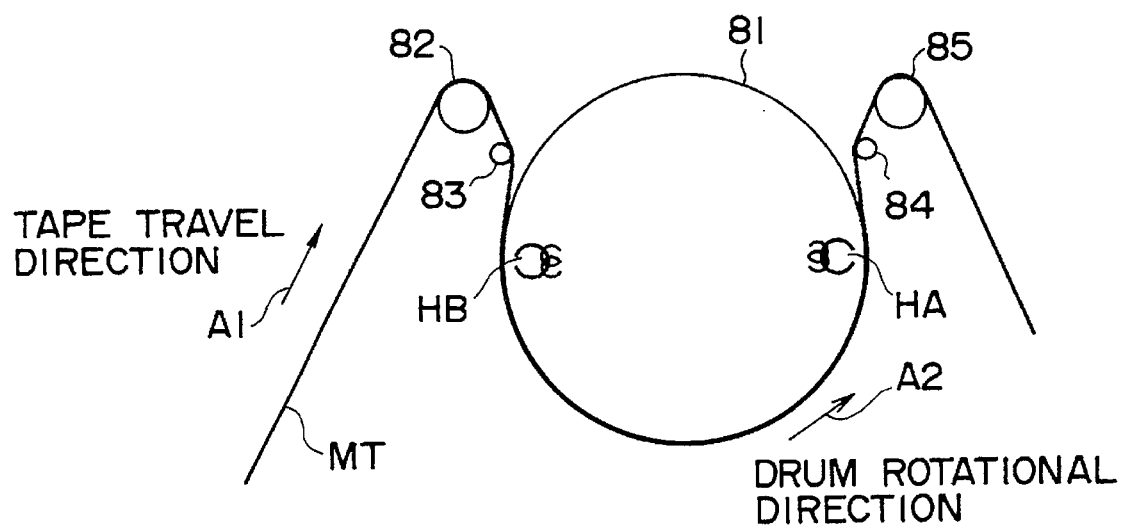
FIGS. 13A–13C are schematic illustrations of the general arrangement of a rotary drum and associated mechanisms used in scanning a recording tape in a conventional VTR.
Figure 13B:
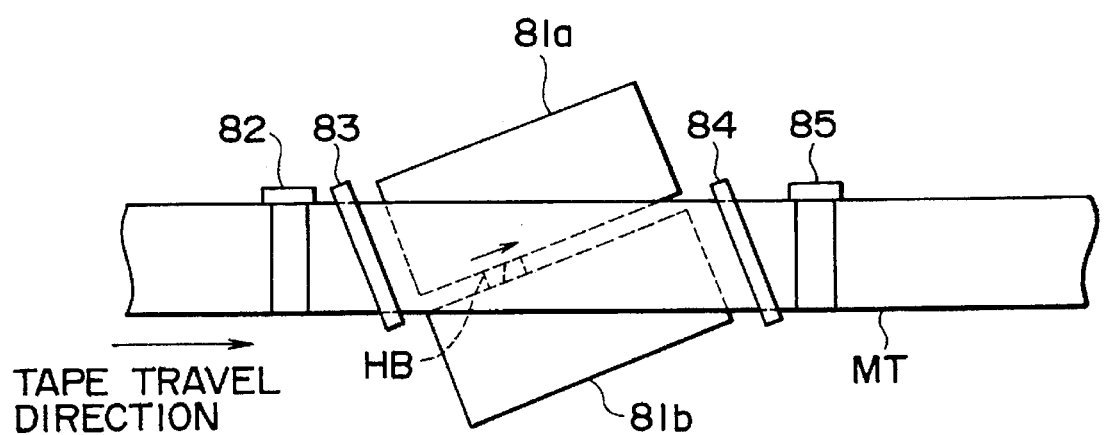
Figure 13C:

Referring to FIG. 12, a reproduction signal supplied from the reproduction amplifier 5A (FIG. 1) is provided as an input signal to a band-pass filter 61 arranged to pass a signal at the frequency f1 and also to a band-pass filter 62 arranged to pass a signal at the frequency f2.

The f1 and f2 cross-talk components are respectively fed through envelope detectors 63 and 64, and low-pass filter 65 and 66 to a differential amplifier 67. The differential amplifier 67 operates so that its output signal is equivalent to the difference in amplitude between the respective cross-talk components representing the pilot signals f1 and f2 received from tracks adjacent to the track scanned by the head HA, and the output signal from the differential amplifier 67 is provided on one path directly to an input of a switching circuit 69 and is sent on another path via an inverter 68 to the other input of the switching circuit 69. A switching signal generator 70 forms a switching control signal on the basis of a rotary pulse signal PG that is generated in relation to the rotation of the rotary drum. The switching control signal generated by the switching signal generator 70 controls the position of the switch 69 for selecting one of the two signals respectively supplied to the inputs of the switching signal 69. The switching control signal is supplied to the switching circuit 69 so that the position thereof is varied in alternating fashion so as to correspond to alternate ones of the tracks scanned by head HA. This operation is performed to invert the polarity of the tracking error signal in correspondence with the inversion of the relationship between the pilot Signals present in the adjacent tracks as the head HA successively scans the tracks T1(A), T3(A), T5(A), and so forth.

The signal output from the switching circuit 69 is amplified by an amplifier 71 and the amplified signal is then provided to drive a capstan motor, which is not shown. Alternatively, there may be provided an embodiment of the invention in which the magnetic head HA is displaceable by means of bimorph leaves or the like, with the control signal being applied to control the displacement of such leaves.

The following is an example of specifications for the magnetic heads and the rotary drum used in a VTR in which the present invention is embodied:

Drum diameter: 21.7 mm
Tape winding angle: 174°
Track pitch: 10 μm
Track angle (θ): about 10°
Azimuth angle (−α, β): −20°, +20°

As compared to a conventional VTR, the track angle in the above embodiment is relatively large, inasmuch as a conventional track angle is about 5° for an 8-mm VTR and about 6° for a VHS format VTR, and the azimuth angle is also relatively large, since the azimuth angle is ±10° for an 8-mm VTR and about ±6° for a VHS format VTR. As a result, the difference between the angles θ+α and θ−β is quite large in the VTR according to the present invention, so that the difference between the respective reproduction signal levels of the two magnetic heads also is relatively large. Such a track angle and set of azimuth angles is particularly appropriate for the tracking control scheme provided according to the present invention in which tracking control is not applied to the magnetic head which has the larger reproduction signal level. Also, by making the track angle larger, the length of each recording track is reduced, which improves track linearity and thus makes it easier to record in narrow tracks.

In the embodiment described above, tracking control is applied with respect to every track reproduced by magnetic head HA. However, it is also contemplated that tracking control may only be applied to every second track reproduced by head HA, or to every third track reproduced by head HA, and so forth.

Figure 15A:
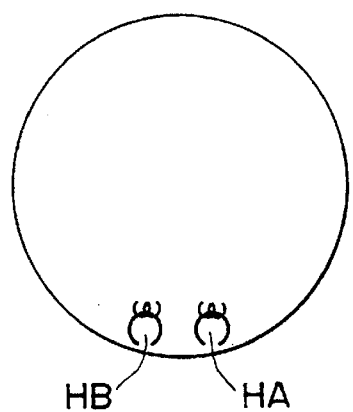
FIGS. 15A and 15B are schematic illustrations of a rotary head drum used in a conventional VTR for recording or reproducing two tracks simultaneously.
Figure 15B:
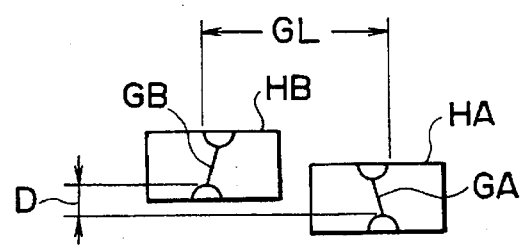
Figure 15C:
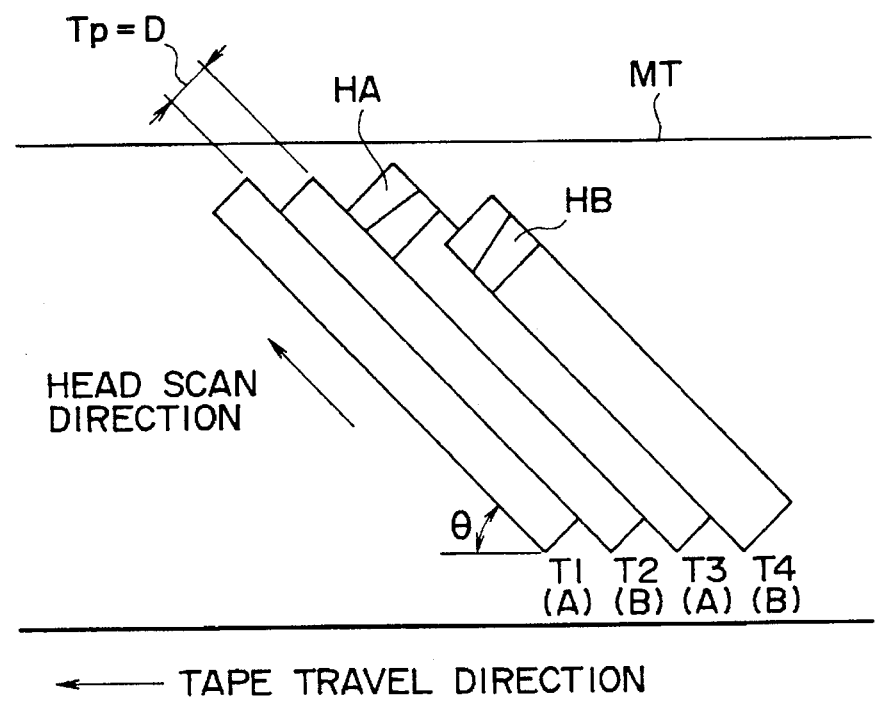
FIG. 15C is an illustration of a recording track pattern produced by such a VTR.

Further, although the invention has been described as being applied to a VTR which has two magnetic heads mounted on a rotary drum at diametrically opposed positions, it is also contemplated to apply the present invention to a VTR having double-azimuth heads such as those shown in FIG. 15.

It should also be understood that the present invention is applicable to a VTR having three or more magnetic heads with mutually different azimuth angles.

Also, in the embodiment described above the pilot signals were generated by a 24-to-25 conversion of a digital video signal. However, this invention can also be applied to other types of rotary head magnetic recording/reproducing apparatus, including digital audio recorders, analog VTR's, recorders using CTL tracking control techniques, and the like.

Having described specific preferred embodiments of the present invention with reference to the accompanying drawings, it is to be understood that the invention is not limited to those precise embodiments, and that various changes and modifications may be effected by one skilled in the art without departing from the scope or spirit of the invention as defined in the appended claims.

What is claimed is:

1. A recording and reproducing circuit for use in a recording and reproducing apparatus of the type that comprises a rotary drum with a magnetic tape wound around said rotary drum and having a magnetic orientation in a direction substantially along the length of the tape, and at least first and second magnetic heads mounted on said rotary drum and operative in recording and reproducing modes of the apparatus to record and reproduce high frequency information signals in successive first and second oblique tracks scanned by said first and second magnetic heads, respectively, as said magnetic tape is advanced in said direction along its length, with each of said first oblique tracks being next adjacent to at least one of said second oblique tracks and each of said oblique tracks extending at an angle θ with respect to said direction of magnetic orientation of the tape, said first and second magnetic heads having mutually different azimuth angles for avoiding cross-talk in respect to said information signals recorded in said next adjacent first and second oblique tracks, said first magnetic head having a magnetic gap that is inclined with respect to said direction of magnetic orientation of said magnetic tape at an angle (θ+α) that is greater than said angle θ and said second magnetic head having a magnetic gap that is inclined with respect to said direction of magnetic orientation of said magnetic tape at an angle (θ−β) that is less than said angle (θ+α), so that, in said reproducing mode of the apparatus, the level of information signals reproduced by said first magnetic head from said first oblique tracks scanned thereby is lower than the level of information signals reproduced by said second magnetic head from said second oblique tracks scanned by said second head by reason of the difference between said angles (θ+α) and (Γ−β); said recording and reproducing circuit comprising:

means operative in said recording mode for generating predetermined low frequency tracking control signals and for supplying said tracking control signals only to said second magnetic head for recording by the latter only in said second oblique tracks;

means connected only with said first magnetic head in said reproducing mode and being then operative for detecting reproduction by said first magnetic head, in scanning one of said first oblique tracks, of said tracking control signals as cross-talk from each of said second oblique tracks which is next adjacent said one of the first oblique tracks; and scanning control means operative in said reproducing mode for controlling only scanning by said first magnetic head in respect to said first oblique tracks in response to said tracking control signals reproduced as cross-talk only by said first magnetic head.

2. A recording and reproducing circuit according to claim 1, wherein said first and second magnetic heads are arranged on said rotary drum so that said first and second oblique tracks are arranged alternately on said magnetic tape with each of said first oblique tracks being interposed immediately between two of said second oblique tracks; said predetermined tracking control signals include first and second tracking control signals at respective different frequencies; said first and second tracking control signals are recorded in alternating ones of said second oblique tracks formed by said second magnetic head so that, in said reproducing mode, said first magnetic head, in scanning one of said first oblique tracks, reproduces said first and second tracking control signals as cross-talk from said second oblique tracks at opposite sides of said one oblique track being scanned, with the relative levels of said first and second tracking control signals reproduced as cross-talk indicating the scanning position of said first magnetic head relative to said one of the first oblique tracks; and said scanning control means includes means for comparing said relative levels of said first and second tracking control signals reproduced as cross-talk by said first magnetic head, and means for varying the speed at which the magnetic tape is advanced during scanning of said one of the first oblique tracks by said first magnetic head in response to a change in the compared relative levels of said first and second tracking control signals reproduced as cross-talk.

3. A recording and reproducing circuit according to claim 2; wherein said scanning control means includes means for reversing the direction in which the speed of advancement of the magnetic tape is varied in response to said change in the compared relative levels of said first and second tracking control signals reproduced as cross-talk for alternating first oblique tracks scanned by said first magnetic head.

4. A recording and reproducing circuit according to claim 2; wherein said information signals comprise frames of a video signal and each of said frames is divided for recording among a plurality of said oblique tracks, said plurality consisting of a number of tracks that is evenly divisible by two.

5. A recording and reproducing circuit according to claim 4; wherein said information signals are digital signals, and said means for generating predetermined tracking control signals includes means for dividing said digital signals into units of 24 bits each and for adding a control bit to each of said units of 24 bits each.

6. A recording and reproducing circuit according to claim 1; wherein said angle $\theta$ is substantially $10°$ and $\alpha=\beta=20°$.

7. A magnetic recording and reproducing apparatus comprising:

a rotary drum with a magnetic tape wound around said rotary drum and having a magnetic orientation in a direction substantially along the length of the tape;

drive means for advancing said magnetic tape in said direction along the length of the tape in recording and reproducing modes of the apparatus;

at least first and second magnetic heads mounted on said rotary drum and operative in recording and reproducing modes of the apparatus to record and reproduce high frequency information signals in successive first and second oblique tracks scanned by said first and second magnetic heads, respectively, as said magnetic tape is advanced in said direction along its length, with each of said first oblique tracks being next adjacent to at least one of said second oblique tracks and each of said oblique tracks extending at an angle $\theta$ with respect to said direction of magnetic orientation of the tape, and said first and second magnetic heads having mutually different azimuth angles for avoiding cross-talk in respect to said information signals recorded in said next adjacent first and second oblique tracks, said first magnetic head having a magnetic gap that is inclined with respect to said direction of magnetic orientation of said magnetic tape at an angle $(\theta+\alpha)$ that is greater than said angle $\theta$ and said second magnetic head having a magnetic gap that is inclined with respect to said direction of magnetic orientation of said magnetic tape at an angle $(\theta-\beta)$ that is less than said angle $(\theta+\alpha)$, so that, in said reproducing mode of the apparatus, the level of information signals reproduced by said first magnetic head from said first oblique tracks scanned thereby is lower than the level of information signals reproduced by said second magnetic head from said second oblique tracks scanned by said second head by reason of the difference between said angles $(\theta+\alpha)$ and $(\theta-\beta)$, respectively;

means operative in said recording mode for generating predetermined low frequency tracking control signals and for supplying said tracking control signals only to said second magnetic head for recording by the latter only in said second oblique tracks;

means connected only with said first magnetic head in said reproducing mode and being then operative for detecting reproduction by said first magnetic head, in scanning one of said first oblique tracks, of said tracking control signals as cross-talk from each of said second oblique tracks which is next adjacent said one of the first oblique tracks; and scanning control means operative in said reproducing mode on said drive means for controlling only scanning by said first magnetic head in respect to said first oblique tracks by varying the speed of advancement of said magnetic tape in response to said tracking control signals reproduced as cross-talk only by said first magnetic head.

8. A magnetic recording and reproducing apparatus according to claim 7; wherein said first and second magnetic heads are arranged on said rotary drum so that said first and second oblique tracks are arranged alternately on said magnetic tape with each of said first oblique tracks being interposed immediately between two of said second oblique tracks; said predetermined tracking control signals include first and second tracking control signals at respective different frequencies; said first and second tracking control signals are recorded in alternating ones of said second oblique tracks formed by said second magnetic head so that, in said reproducing mode, said first magnetic head, in scanning one of said first oblique tracks, reproduces said first and second tracking control signals as cross-talk from said second oblique tracks at opposite sides of said one oblique track being scanned, with the relative levels of said first and second tracking control signals reproduced as cross-talk indicating the scanning position of said first magnetic head relative to said one of the first oblique tracks; and said scanning control means includes means for comparing said relative levels of said first and second tracking control signals reproduced as cross-talk by said first magnetic head, and means for varying the speed at which the magnetic tape is advanced during scanning of said one of the first oblique tracks by said first magnetic head in response to a change in the compared relative levels of said first and second tracking control signals reproduced as cross-talk.

9. A magnetic recording and reproducing apparatus according to claim 8; wherein said scanning control means includes means for reversing the direction in which the speed of advancement of the magnetic tape is varied in response to said change in the compared relative levels of said first and second tracking control signals reproduced as cross-talk for alternating first oblique tracks scanned by said first magnetic head.

10. A magnetic recording and reproducing apparatus according to claim 8; wherein said information signals comprise frames of a video signal and each of said frames is divided for recording among a plurality of said oblique tracks, said plurality consisting of a number of tracks that is evenly divisible by two.

11. A magnetic recording and reproducing apparatus according to claim 10; wherein said information signals are digital signals, and said means for generating a predetermined tracking control signal includes means for dividing said digital signals into units of 24 bits each and for adding a control bit to each of said units of 24 bits each.

12. A magnetic recording and reproducing apparatus according to claim 9; wherein said angle $\theta$ is substantially $10°$ and $\alpha=\beta=20°$.

* * * * *